UNITED STATES PATENT OFFICE.

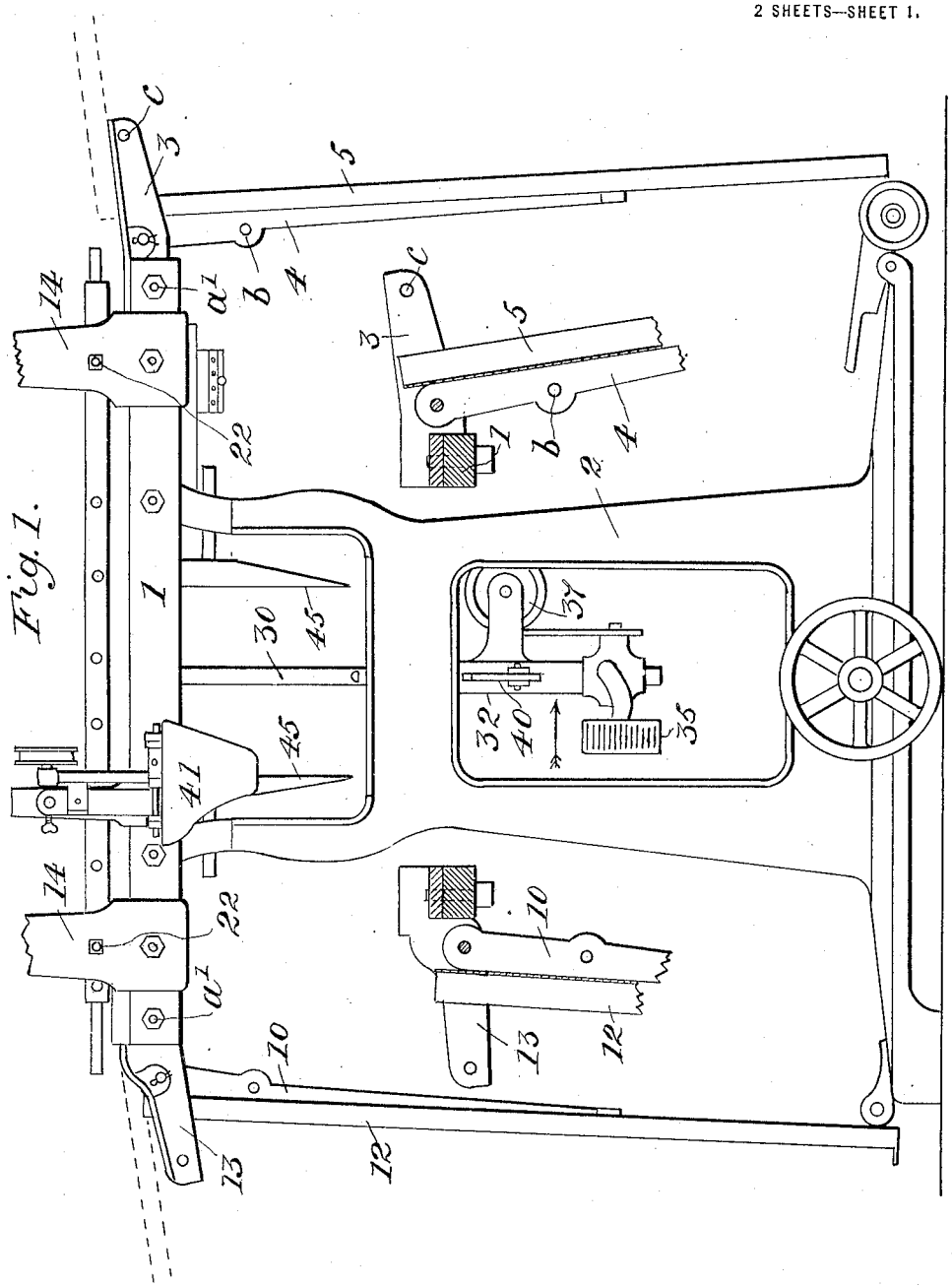

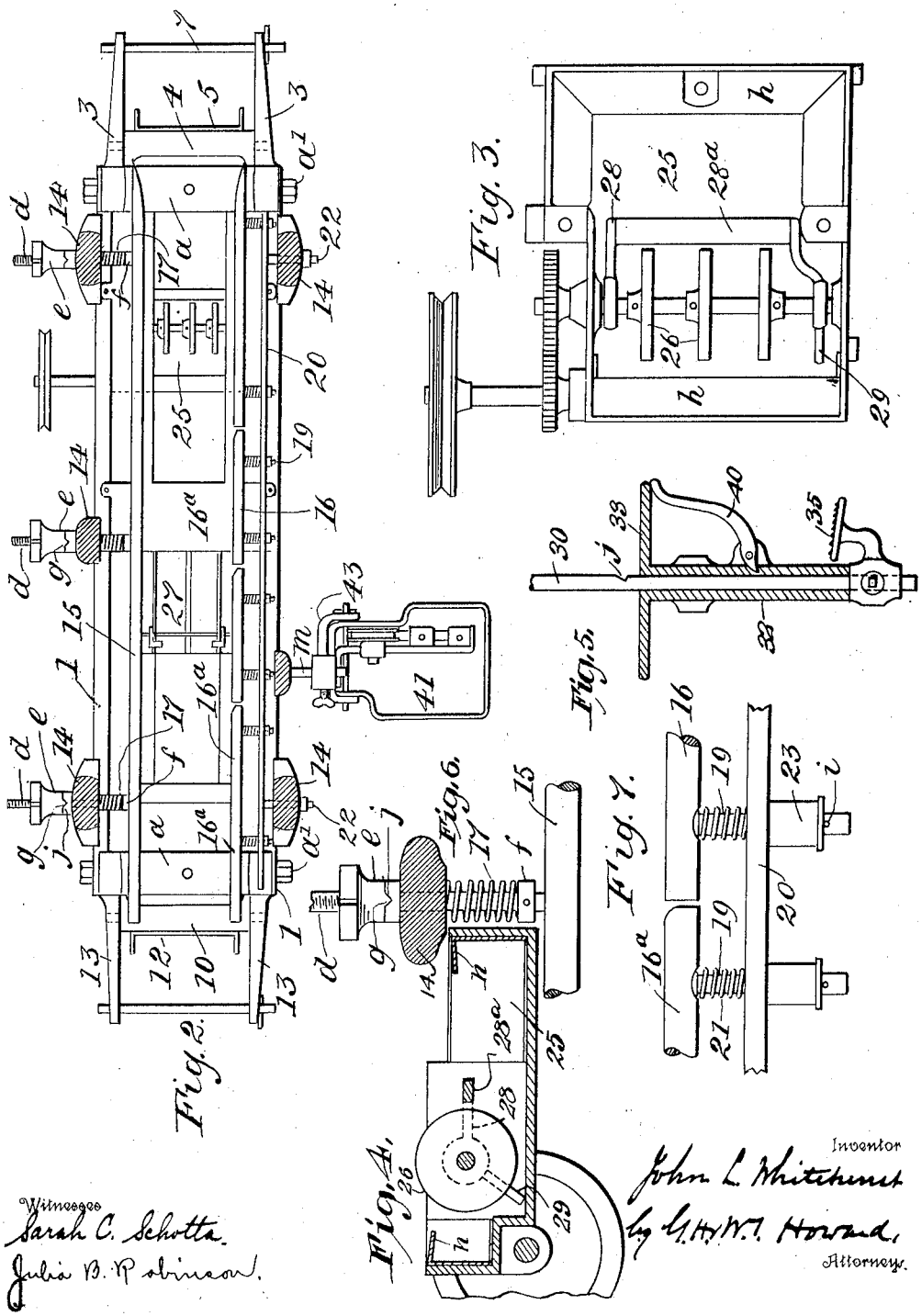

JOHN L. WHITEHURST, OF BALTIMORE, MARYLAND, ASSIGNOR, BY MESNE ASSIGNMENTS, TO JOHN T. WHITEHURST, OF BALTIMORE, MARYLAND.

LABELING-MACHINE.

1,338,603. Specification of Letters Patent. Patented Apr. 27, 1920.

Application filed January 15, 1916, Serial No. 72,247. Renewed March 11, 1920. Serial No. 365,095.

*To all whom it may concern:*

Be it known that I, JOHN L. WHITEHURST, a citizen of the United States, and resident of Baltimore, Maryland, have invented certain Improvements in Labeling-Machines, of which the following is a specification.

In the description of the said invention which follows, reference is made to the accompanying drawings, forming a part hereof, and in which:—

Figure 1 is an exterior side elevation of such parts of the machine as are involved in the present invention, and Fig. 2 a plan of the same.

Fig. 3 is an enlarged top view of the devices whereby hot cement is applied to cans, or other bodies to be labeled as they enter the machine; and Fig. 4 a section of Fig. 3, taken on the broken line $x$—$x$ in that figure.

Fig. 5 is a view of certain parts shown in Fig. 1, looking in the direction indicated by the arrow in that figure.

Figs. 6 and 7 are enlarged views of certain details of the machine.

Referring now to the drawings, 1, 1 are bars which are coupled by means of the cross-pieces $a$ and the bolts $a^1$, to form the frame of the machine; and 2 is the wheeled stand which supports the frame.

3, 3 are brackets secured to the bars 1 at the entrance end of the machine, between which is pivoted the base 4 of the chute 5 upon which the cans, bottles or other similar articles to be labeled are placed.

When the machine is not in use the base 4 together with its chute 5 to which it is secured, is allowed to fall into the position shown in Fig. 1; and to adapt the machine for use the chute is elevated so as to make the hole $b$ in the base register with the holes $c$ in the brackets 3; and a rod 7, shown only in Fig. 2, is inserted through the holes to firmly hold the chute in an inclined position.

A similar base 10 with its chute 12 is applied to the delivery end of the machine, and the brackets which support them are denoted by 13.

14, 14 are standards shown in section, bolted to the bars 1 of the frame of the machine and which among other uses, not herein enumerated, serve to support the guide rails 15 and 16. The guide rail 15 is in one continuous piece, and furnished with threaded bolts $d$ which extend loosely through their adjacent standards 14, and provided with thumb nuts $e$; and between the standards and the collars $f$ on the bolts $d$, are placed spiral springs 17. By means of the nuts and springs described, a limited lateral adjustment of the guide rail 15 which is practically fixed or stationary, is easily obtained; and in order to admit of accuracy and uniformity of adjustment of the said rail, throughout its length, the nuts $e$ are provided with a triangular tooth $g$ adapted to fit a similarly shaped notch $j$ in a projection forming a part of the standard 14, as shown in Figs. 2 and 6, and in consequence in turning the nuts, a uniformity of their rotation in adjusting the rail is easily accomplished.

For the purpose of giving the guide rail 16 generally known as the laterally yielding one, a greater flexibility than heretofore found in such devices, I construct the same in detached sections and make each section $16^a$ independently yielding.

To this end, each section is provided with laterally projecting threaded stems 19 which pass loosely through a bar 20, and loose sleeve 23, and have pins $i$ near their ends; and interposed between this bar and each section of the rails are springs 21. The bar 20 carrying all the rail sections, is adjustable laterally of the machine through the medium of the bolts 22 and suitable nuts, as shown in Fig. 2. With the construction described, it will be understood that the entire rail or any section thereof is yielding which provides for slight differences in the length of the cans, or any peculiarity in the head joints which practically affect their length.

The pot for holding a cement liquefied by heat, is designated by 25, and it, together with the disks which apply the cement to the bodies to be labeled, are now commonly used in labeling machines.

In order that a predetermined and uniform quantity or thickness of cement will at all times be applied to the disks 26 which are rotated in the pot 25, and transfer cement to the cans or other bodies as they are rolled over the disks, a scraper 28 is hung loosely on the shaft to which the disks 26 are secured; and the distance between the lateral portion $28^a$ of the scraper and the periphery of the disks will therefore govern the thickness of the dabs of cement applied to the cans; and in order to prevent the scraper from rotating with the disks, it is provided with a tail piece 29 which rests on the bottom of the pot.

It has been found in transferring labeling machines when the cement in the pot is in a liquefied condition, from one position to another, that the cement is frequently splashed from the pot, and to remedy this, I provide the pot with a plate of any description having downwardly inclined flanges $h$; and as the liquid cement is dashed against the underside of these flanges, it is turned back to the pan without passing outward over the edge.

27 is a label table of any ordinary description, a top view of which is shown in Fig. 2, and is mounted on the upper end of a bar 30 and guided by a tubular hanger 32 through which it passes, and formed as a part of the fixed plate 33.

At the lower end of the bar 30 is a treadle 35, whereby the table 27 can be forced down by the foot, to receive a stack of labels.

The upward or feeding movement of the label table, is caused by a strap which is wound about a spring held sheave 37 as is common in labeling machines.

As it is necessary in seating a stack of labels on the table 27 that the latter should be temporarily held down, I pivot to the tubular hanger 32 a trigger 40 the point of which is adapted, when the table is in its lowest position, to automatically enter a notch $j$ in the bar 30 and so prevent the rise of the table for the time being.

The disengagement of the trigger from the bar is easily effected by hand, whereupon the table with its stack of labels will rise and the uppermost label be forced into alinement with the surface of the bed of the machine as is commonly done in machines of this class.

41 is the pot from which paste is applied to the labels after they have been attached by liquefied cement, to the bodies to be labeled, and its general construction is old in the art.

Its novelty consists in suspending it by means of a rod from a bracket 43 which is slid on a fixed stud 44 projecting from the flange of the machine.

45, 45 are the adjustable guides for the stack of labels, and as their function is well known, they require no description herein.

I claim as my invention:—

1. In a labeling machine, a frame to and from which the can or body to be labeled may be received and discharged, label distributing and pasting means, and a laterally yielding composite guide rail for the rolling cans formed of independently movable sections, combined with an opposite spring-backed continuous guide rail, and means to laterally adjust said continuous rail with respect to said composite rail.

2. In a labeling machine, a frame to and from which the can or body to be labeled may be received and discharged, label distributing and pasting means, and standards erected on said frame, combined with a guide rail for the rolling cans to be labeled, said guide rail consisting of a single continuous bar having threaded bolts which extend therefrom through the said standards and are provided with nuts at their ends, and coiled springs on said bolts between said standards and the rail.

3. In a labeling machine, the combination of a frame to and from which the can or body to be labeled may be received and discharged, said frame being provided with an outwardly extending stud, and paste applying devices for the labels which embody a pot, paste transfer disks therein, a bracket adapted to be slid on the said stud, and a removable rod passed through the said bracket and the pot.

4. In a labeling machine, the combination of a frame to and from which the can or body to be labeled may be received and discharged, label distributing and pasting means, a pot to hold liquefied cement, a rotary shaft carrying disks which apply cement to the bodies of cans rolling over them, a scraper supported by said shaft, and a counterbalancing device to prevent the lifting of said scraper.

5. In a labeling machine, the combination of a frame to and from which the can or body to be labeled may be received and discharged, label distributing and pasting means, a pot adapted to hold heated and liquefied cement, a rotary shaft for said pot carrying disks which apply cement to the bodies of cans rolling over them, a gravity scraper supported by said shaft, the scraping edge of which is in proximity to the periphery of the disks to limit the quantity of cement applied thereto, and devices to prevent the upward movement of said scraper.

JOHN L. WHITEHURST.

Witnesses:
WM. T. HOWARD,
SARAH C. SCHOTTA.